May 16, 1961
J. W. DEWALD
2,984,498
TRAILER
Filed March 10, 1959
2 Sheets-Sheet 1
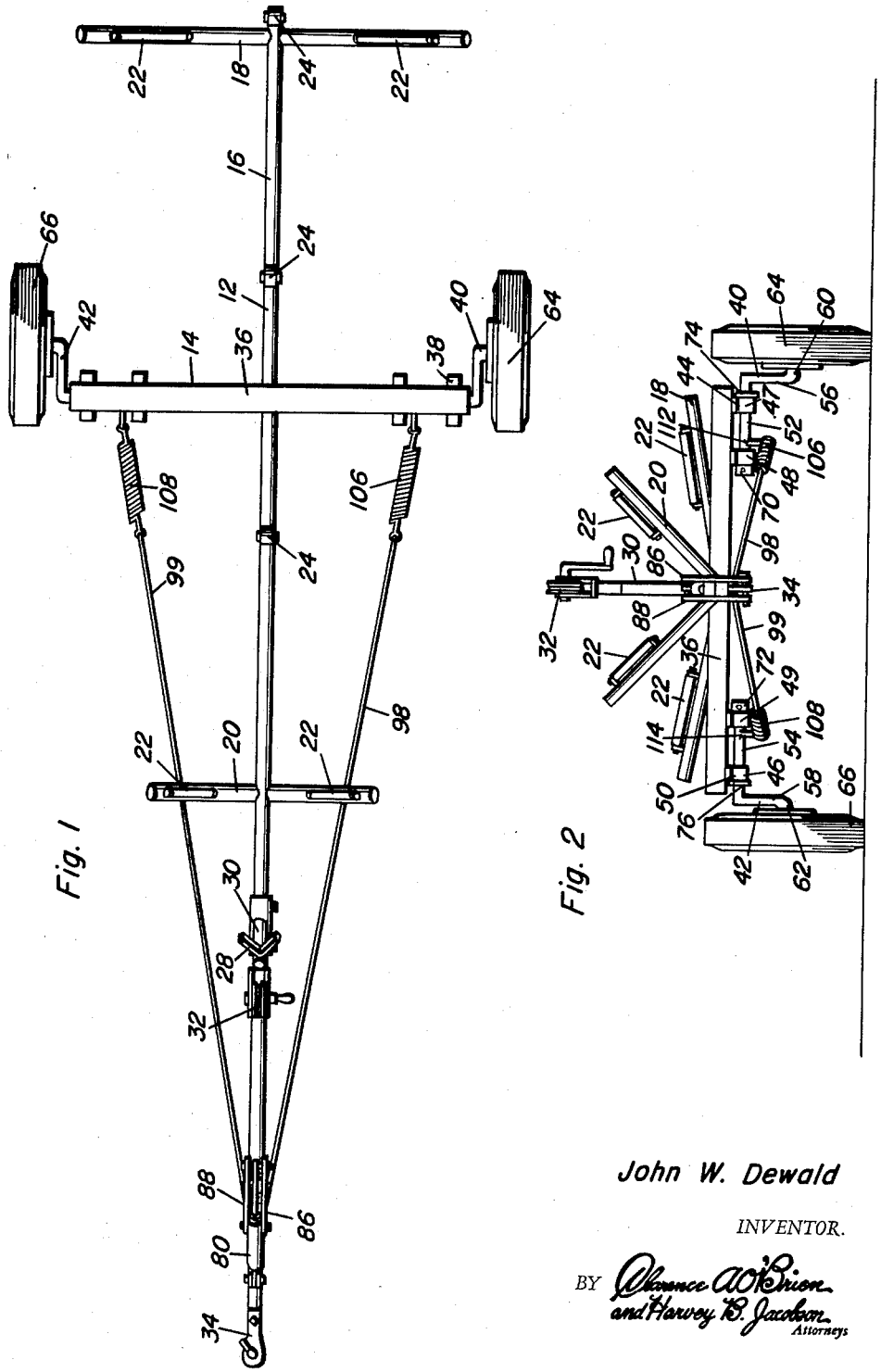
John W. Dewald
INVENTOR.

May 16, 1961     J. W. DEWALD     2,984,498
TRAILER
Filed March 10, 1959     2 Sheets-Sheet 2
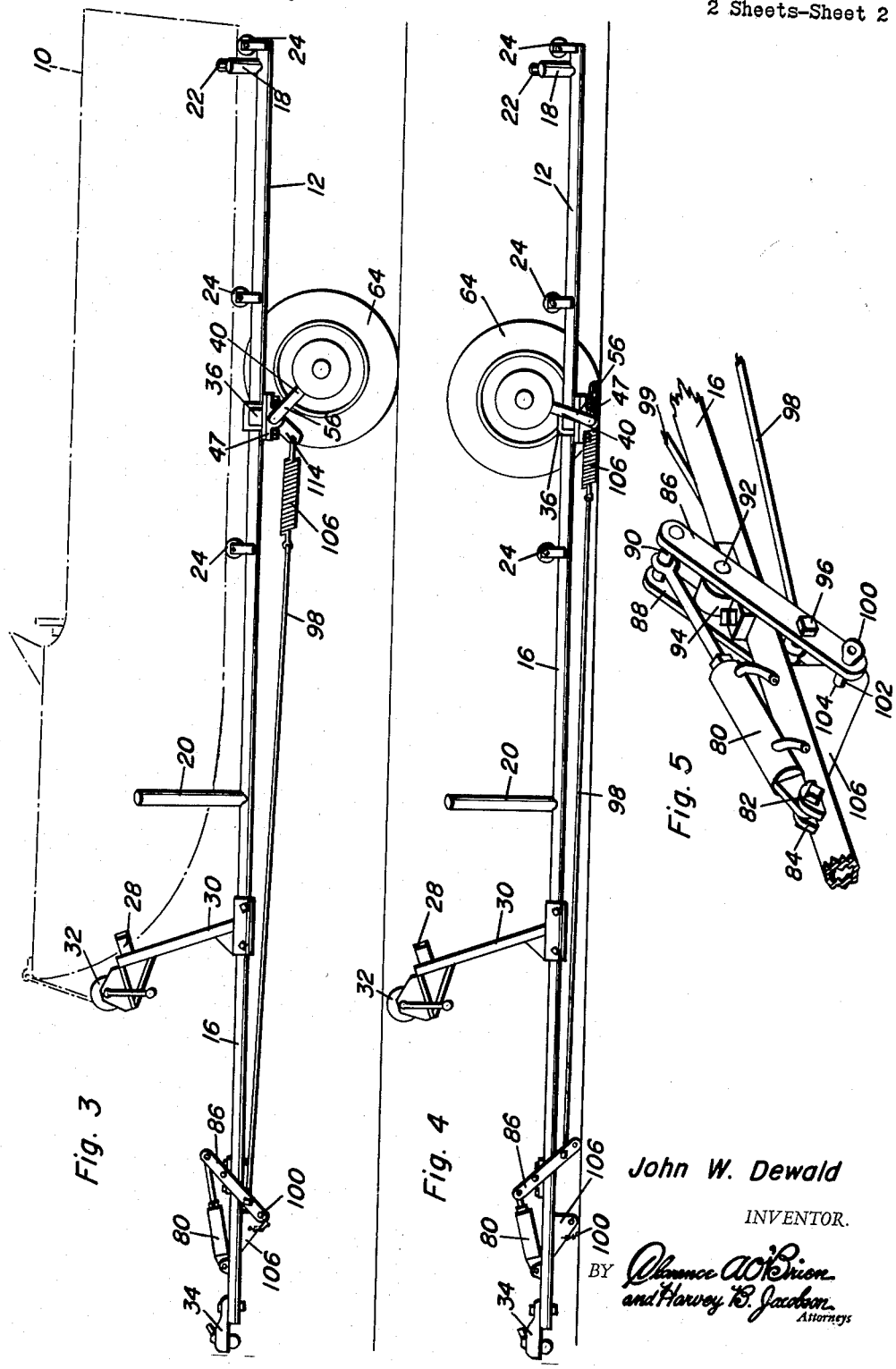
John W. Dewald
INVENTOR.

United States Patent Office 2,984,498
Patented May 16, 1961

2,984,498
TRAILER
John W. Dewald, Rte. 1, Ritzville, Wash.
Filed Mar. 10, 1959, Ser. No. 798,411
4 Claims. (Cl. 280—43.19)

This invention relates to trailers and more particularly to boat trailers.

An object of the invention is to provide a general utility trailer, but principally a trailer that is useful for boats, wherein the loading and unloading of the boat is materially facilitated.

Another object of the invention is to provide a trailer which has a trailer frame capable of being raised and lowered by shifting axle spindle positions. The spindles are in the form of cranks mounted for oscillation on the chassis, and there are means to oscillate the spindles with the result that the wheels carried by the spindles have their vertical positions shifted with reference to the frame.

An important feature of the invention is found in the construction of the means that are used for oscillating the spindles to the desired positions. These means not only serve the primary function of establishing selected vertical relationships between the wheels and the frame but, there are springs constituting portions of these means so that the spindles are capable of slight oscillation within the limits of the springs, to absorb or at least materially attenuate road shock, jars, bumps, etc.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the trailer.

Figure 2 is a front elevational view of the trailer.

Figure 3 is a side view of the trailer in the elevated, boat supporting position.

Figure 4 is a side elevational view similar to Figure 3 but showing the trailer chassis or frame in the lowered position with reference to the wheels thereof.

Figure 5 is a fragmentary perspective view showing a cylinder and a portion of the means actuated by the cylinder for oscillating the wheel spindles to achieve the various positions between the fully raised position of the trailer frame and the fully lowered position.

Boat 10 (Figure 3) shown in the drawings diagrammatically represents the preferred load for a trailer 12, it being understood that the principles of the invention are applicable to trailers regardless of the specific load transported by the trailers. Since boat trailer 12 has been selected to illustrate a preferred form of the invention, the frame or chassis 14 thereof is made of a longitudinal center frame member 16 having transverse laterally extending frame members 18 and 20 longitudinally spaced from each other and equipped with rollers 22 to form a pair of spaced cradles. Addition keel rollers 24 are carried by frame member 16 and are located between the fore and aft cradles. Prow support 28 is mounted on an upstanding bracket 30 attached to frame member 16 in advance of transverse frame member 20. A conventional winch 32 is attached to bracket 30 and has a cable or an equivalent member reeved thereon to engage boat 10 for pulling it onto the trailer or for controlling the speed at which the trailer is withdrawn from the boat. Trailer hitch 34 is secured to the front end of the frame member 16. The trailer structure described above is essentially conventional.

In addition transverse frame member 36 is secured to the frame member 16 intermediate the front and rear ends of frame member 16 and it has an axle 38 carried by it. The axle 38 is constructed of two axle spindles 40 and 42 mounted for oscillation in pairs 44 and 46 of depending pillow blocks 47, 48 and 49, 50. Spindles 40 and 42 are shaped as cranks, having horizontal upper portions 52 and 54 respectively, intermediate vertical portions 56 and 58, and lower horizontal portions 60 and 62 to which wheel hubs are operatively connected to support wheels 64 and 66 respectively. There are means, for example caps 70 and 72 at the inner ends of the spindles 40 and 42 to prevent separation of the spindles from the pillow blocks in one direction, and additional means, for example stops 74 and 76 to prevent inward movement of the wheel spindles with reference to the pillow blocks. Caps 70 and 72 and stops 74 and 76 bear against the opposite surfaces of the pairs of pillow blocks to prevent endwise movement of the wheel spindles yet enable the wheel spindles to be oscillated in the pillow blocks.

A mechanism for adjusting the wheel spindles to enable the frame of the trailer to be raised and lowered with reference to the wheels 64 and 66, is operatively connected with the upper horizontal portions 52 and 54 of the wheel spindles. This mechanism consists preferably of a cylinder 80 which is either pneumatic or hydraulically operated, preferably the latter, pivoted by a pin 82 at one end to the frame member 16. Pin 82 is mounted in a pair of upstanding ears 84 that are welded or otherwise fixed to the frame member 16. The cylinder is also pivotally connected to a pair of operating arms 86 and 88 that are adapted to move in unison and which straddle frame member 16. A transverse pin 90 is attached to arms 86 and 88 and is used for establishing a pivotal connection between cylinder 80 and the operating arms 86 and 88. Transverse pins 92 extending through bearing 94 which is fixed to member 16, are secured to operating arms 86 and 88 between the ends thereof. A final transverse pin 96 attached to and extending between arms 86 and 88, is located beneath frame member 16 and has a pair of operating cables 98 and 99 attached thereto. The lower extremity of one or both arms has a lock 100 by which to hold the arms in a position at which the axle spindles are adjusted so that the trailer frame is elevated (Figure 3). Lock 100 may assume a number of configurations, one being a pin 102 extending through openings in one or both of the arms 86 and 88 and an opening 104 in a bracket 106 that depends from the main longitudinal frame member 16 (Figure 5).

Cables 98 and 99 are secured at their inner ends to springs 106 and 108, and these are, in turn, secured to brackets 112 and 114 which are fixed to the horizontal portions 52 and 54 of the axle spindles 40 and 42.

The lifting and lowering operation of the trailer is achieved in this way: Starting from the elevated position (Figure 3), lock 100 is released by withdrawing pin 102. The weight of the trailer will cause the cables 98 and 99 to be pulled thereby oscillating the arms 86 and 88 to the position disclosed in Figure 4. If a double acting cylinder is used, the return of the fluid from cylinder 80 may be governed by a valve enabling the frame to be slowly lowered. The lowering takes place because the normal position of the axle spindles is with the intermediate portions 56 and 58 to be at an angle to a vertical reference plane whereby the weight of the trailer either loaded or unloaded, tends to rotate the axle spindles in their bearings.

In order to elevate the frame, the cylinder 80 is actuated in the opposite direction causing the operating arms 86 and 88 to be oscillated in a direction to pull cables 98 and 99. The pulling force is applied to the brackets 112 and 114 through springs 106 and 108, and this causes the axle spindles to be oscillated thereby elevating the frame of the trailer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A trailer for a load, said trailer comprising a frame having a longitudinal center frame member, an axle connected with said frame and including a pair of axle spindles, said spindles each being in the shape of a crank having an upper portion mounted for rotation on a part of said frame, a wheel connected with another portion of each of said spindles, means connected with portions of said spindles and said frame for oscillating said spindles and thereby altering the position of said wheels with reference to said frame, said spindle operating means including an operating arm means, said operating arm means including a pair of arm members disposed in parallel and spaced relation, connecting means rigidly interconnecting corresponding end portions of said arm members, means secured to said longitudinal frame member for journaling said arm members for rotation relative to said longitudinal frame member about a horizontal axis extending transversely of said longitudinal frame member and said operating arm intermediate said connecting means with said arm members disposed on opposite sides of said longitudinal frame member, a pair of cables, means securing said cables to one of said connecting means, an extensible motor secured to the other of said connecting means and to said frame for actuating said operating arm members, and means connecting said cables to said spindles, the last mentioned means including a spring attached to each cable whereby said springs attenuate road shocks and jars by permitting limited oscillation of said axle spindles.

2. The trailer of claim 1 wherein there is a lock operatively connected with said operating arm and said frame releasably holding said operating arm in one position.

3. The trailer of claim 2 wherein there are means on the trailer to support a boat whereby said trailer is a boat trailer.

4. The trailer of claim 1 wherein said springs are coil springs arranged with their longitudinal axes coextensive with the cables.

References Cited in the file of this patent

UNITED STATES PATENTS

| | | |
|---|---|---|
| 2,059,205 | Buffington | Nov. 3, 1936 |
| 2,227,762 | Ronning | Jan. 7, 1941 |
| 2,506,699 | Byrd | May 9, 1950 |
| 2,532,577 | Silver | Dec. 5, 1950 |
| 2,621,942 | Getz | Dec. 16, 1952 |
| 2,793,774 | Lovegreen | May 28, 1957 |
| 2,807,381 | Tegeler | Sept. 24, 1957 |
| 2,817,537 | Atkinson | Dec. 24, 1957 |